United States Patent

[11] 3,615,809

| [72] | Inventors | Floyd B. Nagle<br>Midland;<br>Kenneth R. Hock, Gladwin; Winfield Scott<br>Haynes, Jr., Freeland, all of Mich. |
|---|---|---|
| [21] | Appl. No. | 763,009 |
| [22] | Filed | Sept. 26, 1968 |
| [45] | Patented | Oct. 26, 1971 |
| [73] | Assignee | The Dow Chemical Company<br>Midland, Mich. |

[54] COMPACTED PIGMENT COMPOSITIONS
4 Claims, No Drawings

[52] U.S. Cl............................................................ 106/300,
106/288 Q, 106/307, 106/308 F
[51] Int. Cl............................................................ C08s 1/36,
C09c 1/36
[50] Field of Search........................................... 106/308 F,
307, 300, 288 Q

[56] References Cited
UNITED STATES PATENTS

| 1,987,980 | 1/1935 | Sweitzer................ | 106/308 F |
|---|---|---|---|
| 2,236,296 | 3/1941 | Minich et al............ | 106/308 F |
| 2,386,885 | 10/1945 | Downs et al............ | 106/308 F X |
| 3,252,810 | 5/1966 | Somers................... | 106/308 F X |
| 3,320,169 | 5/1967 | East et al................ | 106/308 F X |

*Primary Examiner*—Tobias E. Levow
*Assistant Examiner*—H. M. S. Sneed
*Attorneys*—Griswold & Burdick and Richard G. Waterman

ABSTRACT: The invention relates to pigmented or colored thermoplastic polymers and pertains especially to compacted pigment compositions that are readily dispersed in thermoplastic polymers to make uniformly colored or pigmented polymer articles.

COMPACTED PIGMENT COMPOSITIONS

This invention relates to the manufacture of pigmented or colored thermoplastic polymers. It relates more particularly to readily dispersible compacted pigment compositions and their use for making pigmented thermoplastic polymers.

In the coloring of thermoplastic polymers with pigments, it is common practice to blend one or a mixture of pigments with the granular polymer and to thereafter mold the mixture, or to feed the mixture to a Banbury mixer or a plastics extruder wherein the mixture is heated to the softening point of the polymer or above and is mechanically worked and blended into a uniform mass after which it is removed, e.g., by extrusion, and is cooled and cut or ground to a granular form suitable for molding. The methods heretofore employed for making pigment compositions or concentrates for use in the making of colored thermoplastic polymers have the disadvantages of dusting and of requiring multiple processing steps and have not been entirely satisfactory.

Accordingly, it is a primary object of the invention to provide particulate or granular pigment compositions or concentrates which are readily dispersible in thermoplastic polymers to form products of uniform color upon molding. Another object is to provide nondusting pigment compositions, and concentrates which are readily dispersible in thermoplastic polymers. Still another object is to provide a method and pigment compositions for coloring thermoplastic polymers. Other and related objects may appear from the following description of the invention.

According to the invention nondusting pigment compositions or concentrates which are readily dispersible in thermoplastic polymers upon shaping by usual injection or extrusion molding techniques to form colored articles of manufacture free from streaks or mottle can readily be prepared by intimately mixing, e.g., by stirring, tumbling or grinding, together one or more pigments and a metal salt of a fatty acid having from 12 to 26, preferably from 14 to 24, carbon atoms, which metal is selected from the group consisting of (a) Li, Na, K, Rb and Cs of group I of the periodic table, (b) Mg, Ca, Zn, Sr, Cd and Ba of group II of the periodic table, (c) Al of Group III of the periodic table and (d) Sn and Pb of Group IV of the periodic table, then compacting said mixture under pressures in range of at least about 10 tons per square inch (t.s.i.) between compacting rolls and such that the compacted pigment composition is removed from the rolls as granules a ribbon, or sheet, that is nondusting and readily broken to a substantially nondusting particulate form by pressure of the fingers, after which the compacted material is crushed or broken to a granular form suitable for mixing or blending with a thermoplastic polymer, preferably in particulate form.

It is important in the making of the compacted pigment compositions that the metal salt of the fatty acid and the pigment be in finely divided form and that they be intimately and uniformly mixed with one another substantially as individual particles free or substantially free from agglomerates of either of said ingredients prior to compacting the mixture, in order to obtain the nondusting readily dispersible pigment compositions of the invention. Such mixing can be accomplished by stirring or tumbling a mixture of the ingredients, but is most readily obtained by grinding a mixture of the ingredients in a ball mill, a hammer mill, a pulverizer, or micronizer, which has an action of shearing agglomerates of particles of said ingredients or of otherwise breaking up the agglomerates into individual particles intimately and uniformly dispersed into a free flowing body of said materials. Such mixtures of the ingredients when compacted are readily broken up into granular form, are dustless or substantially free from dustlike particles, and are readily dispersible in thermoplastic organic polymers to produce uniformly colored products.

The metal salt of the fatty acid can be used in amounts corresponding to from about 5 to 40, preferably from 10 to 40, percent by weight of the composition, i.e., the sum of the weights of the pigment and the fatty acid metal salt.

In a preferred practice the pigment compositions contain from about 5 to 40 percent by weight of the metal salt of the fatty acid, from 5 to 20 percent by weight of a fatty acid having from 12 to 26 carbon atoms and the balance pigment per 100 parts by weight of the composition, with the proviso that 10 to 40, and preferably 15 to 40 percent by weight of the composition consists of fatty acid and metal salt of fatty acid, and correspondingly from 90 to 60, preferably 85 to 60 percent is pigment.

Best results are obtained when the pigment compositions contain from 10 to 40 percent by weight of fatty acid metal salt from about 5 to about 20 percent be weight, based on the weight of the composition, of a fatty acid having from 12 to 26 carbon atoms, and the balance is pigment. The fatty acid may be the same or different from the fatty acid of the metal salt employed.

In a preferred practice the fatty acids contain from 14 to 24 carbon atoms. Among suitable fatty acids are myristic, palmitic, stearic, archidic, behenic, and lignoceric acid. The metal salts of the fatty acids are salts of said acids and preferably a metal selected from the group consisting of zinc, calcium, aluminum, magnesium, lead and lithium.

The compacted pigment compositions preferably consist essentially of the insoluble finely divided organic or inorganic pigment or a mixture of two or more of such pigments, the fatty acid, and the metal salt of the fatty acid or a mixture of two or more metal salts of the fatty acids, and with one or more of the fatty acids.

The compacting is carried out in usual ways and with apparatus, e.g., compacting rolls, similar to those employed in the compacting of metal powders, by feeding the mixture of pigment and added agents into the nip of said compacting rolls and subjecting the mixture to compacting pressures of from about 10 tons per square inch to 100 tons per square inch to form a friable cohered mass not exceeding about 0.25 inch thick. The compacted material is crushed or ground to a granular form suitable for blending with the thermoplastic polymers, suitably in the form of molding granules of the thermoplastic polymers.

The compacted pigment compositions are useful for blending with thermoplastic organic polymers or synthetic elastomers of various kinds to form pigmented or colored plastics and elastomers suitable for a variety of uses in the home and industry.

An advantage of the compacted pigment compositions is the ease with which the pigment is dispersed throughout the thermoplastics polymers by usual mixing, compounding or mechanically working of the granular pigment composition with a heat-softened or molten thermoplastic polymer on compounding rolls, in a Banbury mixer, a plastics extruder, or in a screw injection molding machine. Other advantages are the freedom from dusting of the pigment or color, and the improved uniform dispersion of color free from streaks and mottle in plastics as compared to the heretofore known methods.

The compacted pigment compositions can be incorporated into thermoplastic organic polymers of all kinds and in synthetic elastomers. Among such polymers and elastomers are, polystyrene, copolymers of styrene and acrylonitrile, copolymers of styrene, acrylonitrile and a polybutadiene rubber, or rubbery copolymers of ethylene and vinyl acetate, copolymers of ethylene and ethyl acrylate, polyvinyl chloride, copolymers of vinyl chloride and vinyl acetate, copolymers of vinylidene chloride and vinyl chloride, polymethyl methacrylate, copolymers of styrene and methacrylate, polybutadiene, elastomeric copolymers of butadiene and styrene, block copolymers of styrene and butadiene, polyisopropene, copolymers of butadiene and isoprene, polycarbonates, polyesters, polyethylene terephthalate, and polyamide resins.

The compacted pigment compositions are used in amounts corresponding to from about 0.5 to 5 parts by weight of the compacted pigment composition per 100 parts by weight of the organic polymer to be colored, but greater or lesser amounts can be used.

Small amounts of soluble organic dyes, coloring agents, light stabilizing agents, heat stabilizers, antioxidants, plasticizers, and the like can also be included, but are not required in the invention.

EXAMPLE 1

A. A charge of 80 parts by weight of titanium dioxide, (TiO2), pigment and 20 parts by weight of zinc stearate were ground in a ball mill. A charge of 95 parts by weight of the ground mixture and 5 parts by weight of stearic acid were blended by tumbling in a blender. The blended mixture was compacted or densified by subjecting it to pressure of about 30 tons per square inch (t.s.i.) between a pair of compacting rolls after which the compacted material was crushed or broken to a granular form, then was screened through U.S. Standard Screens. There was obtained 91 percent granular product through a No. 8 and on a No. 18 screen and 9 percent fines through the No. 18 screen.

B. A charge consisting of 80 parts by weight of titanium dioxide and 20 parts of zinc stearate was ground in a ball mill, then was compacted at about 30 t.s.i. and broken to a granular form. There was found 54 percent of granular product on No. 18 mesh screen and 46 percent fines through the screen.

Each of the compacted pigment compositions of particle sizes retained on the No. 18 mesh screen prepared in parts A and B above were dry blended by tumbling one part by weight of the compacted pigment composition with 100 parts by weight of granular molding grade polystyrene. The blended mixture was screw injection molded to form test pieces of 2×3 inches by 0.1 inch thick. The test pieces were of uniform color and free from streaks or mottle.

The fines or material passing through the 18 mesh screen can be again compacted and broken to form a further quantity of particulate product of the desired sizes.

EXAMPLE 2

A color formulation was prepared by blending together portions of individual pigments predispersed or ground with zinc stearate in amount as stated below employing the recipe:

| Pigment Kind | Zinc Stearate % | Parts by Weight |
|---|---|---|
| Titanium Dioxide | 20 | 292.0 |
| Amaplast Rubinol Red | 0 | 0.5 |
| Phthalacyanine Green | 15 | 5.3 |
| Ultramarine Blue | 33.3 | 9.0 |
| Carbon Black | 33.3 | 9.0 |

The mixture of materials was dry blended with 5 percent of its weight of stearic acid by tumbling, then was compacted under about 30 t.s.i. pressure between compacting rolls, after which the compacted material was broken and screened on a No. 18 mesh U.S. Standard screen. There was obtained 88 percent granular material on the 18 mesh screen and 12 percent fines through the screen. The compacted color formulation was readily dispersible in polystyrene in a concentration of one part of the compacted color formulation to 100 parts of polystyrene by screw injection molding to form test pieces of a uniform grey color free from streaks or mottle.

EXAMPLE 3

A color formulation was prepared by blending together portions of individual pigments ground with zinc stearate in amount as stated below employing the recipe:

| Pigment Kind | Zinc Stearate % | Parts by Weight |
|---|---|---|
| Titanium Dioxide | 20 | 86.5 |
| Cadmium Yellow | 20 | 3.1 |
| Phthalocyanine Green | 15 | 6.06 |
| Ultramarine Blue | 33.3 | 9.5 |
| Carbon Black | 33.3 | 0.352 |

The mixture of materials was dry blended with 5 percent of its weight of stearic acid, then was compacted under about 30 t.s.i. pressure between compacting rolls after which the compacted material was broken to a granular form and screened. It was found to be 74 percent granular product on a 18 mesh U.S. Standard screen and 26 percent fines through the screen. One part of the compacted color formulation of particle sizes on the 18 mesh screen were mixed with 100 parts of a granular copolymer of 95 percent styrene and 5 percent GR-S rubber and screw injection molded to form test pieces. The molded test pieces were of a uniform turquoise color and were free from streaks or mottle.

EXAMPLE 4

In each of a series of experiments, a charge of 90 parts by weight of a pigment mixture, consisting of 98 percent by weight of titanium dioxide powder and 2 percent by weight of zinc stearate, and 10 parts by weight of a metal salt of a fatty acid as stated in the following table were blended together. The mixture was compacted between rolls of a Komerak-Greaves Model L 405 Laboratory Compactor at a roll spacing of about 0.046 inch and an accumulator pressure of from about 2,000 to 2,500 p.s.i. gauge pressure and corresponding to more than 20 tons per square inch pressure on the material being compacted. The compacted pigment was crushed to a granular form.

A charge of 2,500 grams of granular molding grade polystyrene, 16.7 grams of the compacted pigment mixture and 5 grams of Ultramarine Blue were blended together. The blended mixture was screw injection molded to form test plates of 2×3 inches by 0.1 inch thick. In molding the test pieces the first five molded pieces were discarded. The succeeding molded pieces were observed for uniformity of color, streaks of pigment and/or mottle. Table I identifies the experiments and the metal salt of the fatty acid used in preparing the composition. The table also gives the observed rating of uniformity of color and freedom from streaks and/or mottle found in the molded test pieces under the heading "Remarks."

TABLE I

| Run No. | Pigment parts | Metal salt of fatty acid Kind | | Parts | Remarks |
|---|---|---|---|---|---|
| 1 | 90 | Zinc Stearate | | 10 | Good |
| 2 | 90 | Zinc Stearate | Den. 4–6 lbs/cu.ft. Thru 325 mesh | 10 | Very good |
| 3 | 90 | Zinc Stearate | Den. 3–5 lbs/cu.ft. Thru 325 mesh | 10 | Very good |
| 4 | 90 | Aluminum monostearate | | 10 | Good |
| 5 | 90 | Aluminum Distearate | | 10 | Good |
| 6 | 90 | Aluminum Tristearate | | 10 | Good |
| 7 | 90 | Aluminum Hydroxy Stearate | | 10 | Good |
| 8 | 90 | Sodium Stearate | | 10 | Good |
| 9 | 90 | Lithium Stearate | | 10 | Good |
| 10 | 90 | Barium Stearate | | 10 | Good |
| 11 | 90 | Calcium Stearate | | 10 | Good |
| 12 | 90 | Magnesium Stearate | | 10 | Good |
| 13 | 90 | Aluminum Palmitate | | 10 | Good |
| 14 | 90 | Zinc Palmitate | | 10 | Good |
| 15 | 90 | Zinc Behenate | | 10 | Good |

EXAMPLE 5

In each of a series of experiments, a charge of 80 parts by weight of titanium dioxide and 20 parts by weight of zinc stearate were ground in a hammer mill. A charge of 95 parts by weight of the ground mixture and 5 parts by weight of stearic acid were blended together. The mixture was compacted between rolls of a Komerak-Greaves Model L 405 compactor at a roll spacing of about 0.046 inch and at 900, 1800 and 2500 p.s.i. gauge accumulator pressure. The compacted pigment mixture was crushed to a granular or powdered form. A charge of 16 grams of the compacted pigment mixture and 4 grams of Ultramarine Blue pigment were blended together. A charge of 1 part by weight of the resulting mixture was blended with 100 parts by weight of granular molding grade polystyrene. This mixture was injection molded to form test pieces employing procedure similar to that employed in example 1. The test pieces were of uniform color and were free from streaks and mottle.

EXAMPLE 6

In each of a series of experiments, 10 parts by weight of a pigment grade titanium dioxide intimately mixed with two percent by weight of zinc stearate, was mixed with a further quantity of a stearate, or a stearate and stearic acid, in amounts as stated in the following table. The mixture was passed through a hammer mill to intimately disperse the ingredients with one another. The hammer-milled material was compacted between rolls of a Komerak-Greaves Model L 405 compactor at a roll spacing of 0.032 inch and 1800 p.s.i. gauge accumulator pressure. The compacted mixture was crushed to a granular form and was screened to recover the granular particles passing through a No. 8 and retained on a No. 18 U.S. Standard screen. A charge of 16 parts by weight of the compacted pigment particles and 4 parts by weight of Ultramarine Blue pigment were blended with 100 parts by weight of granular molding grade polystyrene, by tumbling the mixture in a blender. This mixture was screw injection molded to form test pieces of 2×3 inches by 0.1 inch thick. The test pieces were examined for color, streaks or mottle. Table II identifies the experiments and gives the color of the molded test piece.

TABLE II

| Run No. | TiO$_2$ Parts | Stearic Acid Parts | Zn Stearate Parts | Al-tri Stearate Parts | Product Remarks |
| --- | --- | --- | --- | --- | --- |
| 1 | 10 | 0 | 0 | 0 | Streaks |
| 2 | 10 | 0 | 1 | 0 | Uniform Color No Streaks |
| 3 | 10 | 0.5 | 1 | 0 | Do. |
| 4 | 10 | 0 | 0 | 1 | Do. |

EXAMPLE 7

A charge of 75 parts by weight of a pigment grade silicone treated TiO2 was intimately blended by tumbling with 20 percent by weight of aluminum tristearate and 5 percent stearic acid. The mixture was compacted, crushed, screened, mixed with Ultramarine Blue pigment, then a portion of the mixture blended with polystyrene granules, and the resulting mixture molded into test pieces employing procedure described in Example 6. The test pieces were of uniform color and were free from streaks and mottle.

EXAMPLE 8

A charge of 80 parts by weight of titanium dioxide in finely divided form and 20 parts by weight of zinc stearate was ground in a hammer mill. A charge of 95 parts by weight of the ground mixture was mixed with 5 parts of powdered stearic acid. The mixture was compacted between rolls of a Komerak-Greaves Model L 405 compactor at a roll spacing of about 0.032 inch and 1800 pounds per square inch gauge pressure on the accumulator. The compacted material was crushed to a granular form, and was screened to separate the fines from the granules passing through a No. 8 and retained on a No. 18 U.S. Standard screens. The screened material was dust free, and could readily be crushed between the fingers.

For purpose of testing the dispersibility in thermoplastic organic polymers, a charge of 16 parts by weight of the screened compacted pigment composition was mixed with 4 parts by weight of Ultramarine Blue pigment by tumbling. A charge of 1 part by weight of this mixture is added to 99 parts by weight of a thermoplastic organic polymer in the form of granules of sizes between about 0.04 and 0.10 inch (about 1.0 to 2.5 millimeters). The mixture is blended by tumbling. The blend is fed to the heating chamber of a screw injection molding apparatus comprising in combination a barrel terminating in an extrusion outlet adjacent to a mold for making a test wafer of 2×3 inches by 0.1 inch thick, said barrel having a rotatable mixing head next to said extrusion orifice and a plunger slidable upon the shaft and rotating said mixing head for injection molten or heat softened plastic material from said heating chamber, through said mixing head and into said mold. Among thermoplastic organic polymers in which the compacted pigment compositions are readily dispersible to produce uniformly colored products are olefin polymers such as polyethylene, polypropylene, poly-4-methylpentene-1, polystyrene, high-impact styrene polymers, e.g. styrene polymers toughened with from 2 to 20 percent of a rubbery butadiene polymer, styrene-acrylonitrile-rubber polymers (ABS), copolymers of styrene and acrylonitrile, copolymers of styrene and methyl methacrylate, polymethyl methacrylate, copolymers of about 85 percent ethylene and 15 percent vinyl acetate, copolymers of about 73 percent ethylene and 27 percent ethyl acrylate, polybutadiene, styrene-butadiene block copolymers, polyvinyl chloride, copolymers of 85 percent vinyl chloride and 15 percent vinyl acetate, polyamide resins, and copolymers of from 80 to 95 percent styrene and about 2 to 20 percent polybutadiene.

We claim:

1. A compacted pigment composition consisting essentially of a mixture of (1) from about 60 to 95 percent by weight of an insoluble finely divided pigment, (2) from 40 to 5 percent by weight of a metal salt of a fatty acid having from 12 to 26 carbon atoms, which metal is selected from the group consisting of Mg, Na, K, Rb, Cs, mg. Ca Zn, Sr, Cd, Ba, Al, Sn, and Pb and (3) from 0 to 20 percent by weight of a fatty acid having from 12 to 26 carbon atoms, which mixture consists of at least 15 percent by weight of (2) or of (2) and (3) and has been compacted under pressure of at least about 10 tons per square inch to form a friable cohered mass not exceeding 0.25 inch thick.

2. A composition as claimed in claim 1, wherein the metal salt of the fatty acid is zinc stearate.

3. A compacted pigment composition consisting essentially of from 60 to 95 percent by weight TiO2, from 40 to 5 percent by weight of zinc stearate and from 5 to 20 percent by weight of stearic acid, with the proviso that said composition consists of at least 15 percent by weight of zinc stearate and stearic acid, which composition has been compacted under pressure of at least about 10 tons per square inch into a friable cohered mass not exceeding 0.25 inch thick.

4. A compacted pigment composition consisting essentially of from 60 to 95 percent by weight of an insoluble finely divided pigment, from 40 to 5 percent by weight of zinc oxide and behenic acid in amount corresponding to from about 5 percent less than, to about 20 percent greater than, a chemically equivalent amount of said behenic acid to react with said zinc oxide and form zinc behenate.